United States Patent
Perusse, Jr. et al.

(10) Patent No.: US 9,495,997 B2
(45) Date of Patent: Nov. 15, 2016

(54) SYSTEM AND METHOD FOR DYNAMIC ENABLEMENT OF STORAGE MEDIA ASSOCIATED WITH AN ACCESS CONTROLLER

(75) Inventors: Charles T. Perusse, Jr., Pflugerville, TX (US); Manoj Sharad Gujarathi, Round Rock, TX (US); Yousef Yacoub, Cedar Park, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 1112 days.

(21) Appl. No.: 12/349,296

(22) Filed: Jan. 6, 2009

(65) Prior Publication Data

US 2010/0172050 A1    Jul. 8, 2010

(51) Int. Cl.
| | |
|---|---|
| G06F 3/00 | (2006.01) |
| G11B 15/68 | (2006.01) |
| G11B 17/22 | (2006.01) |
| G06F 13/10 | (2006.01) |
| G06F 13/38 | (2006.01) |
| G06F 9/44 | (2006.01) |

(52) U.S. Cl.
CPC .......... *G11B 15/689* (2013.01); *G11B 17/228* (2013.01); *G06F 9/4411* (2013.01); *G06F 13/102* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 6,453,383 B1* | 9/2002 | Stoddard et al. | 711/112 |
| 7,617,400 B2* | 11/2009 | Zimmer et al. | 713/190 |
| 2004/0088513 A1* | 5/2004 | Biessener et al. | 711/173 |
| 2004/0199896 A1* | 10/2004 | Goodman et al. | 717/100 |
| 2006/0200858 A1* | 9/2006 | Zimmer et al. | 726/15 |
| 2009/0119497 A1* | 5/2009 | Beelitz et al. | 713/2 |
| 2009/0177877 A1* | 7/2009 | Holdaway et al. | 713/2 |
| 2009/0319532 A1* | 12/2009 | Akelbein et al. | 707/10 |
| 2010/0099491 A1* | 4/2010 | Little et al. | 463/29 |

* cited by examiner

*Primary Examiner* — Henry Tsai
*Assistant Examiner* — Aurangzeb Hassan
(74) *Attorney, Agent, or Firm* — Baker Botts L.L.P.

(57) ABSTRACT

Systems and methods for reducing problems and disadvantages associated traditional approaches to provisioning using access controllers are disclosed. A method may include storing a definition data structure in storage media associated with an access controller in an information handling system, the definition data structure including one or more parameters. The access controller may create a storage partition on the storage media based at least on the one or more parameters.

20 Claims, 2 Drawing Sheets

SYSTEM AND METHOD FOR DYNAMIC ENABLEMENT OF STORAGE MEDIA ASSOCIATED WITH AN ACCESS CONTROLLER

TECHNICAL FIELD

The present disclosure relates in general to information handling systems, and more particularly to dynamic enablement of storage media associated with an access controller of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Provisioning of information handling systems has long been used in large computing networks, for example, corporate networks. "Provisioning" broadly refers to a process that may enable administrators to enforce network security policies and/or assign system resources and privileges to users of information handling systems in a computing network (e.g., employees, contractors and business partners of a particular business enterprise). Historically, provisioning has required substantial human interaction and/or intervention with individual information handling systems being provisioned. For example, in traditional provisioning approaches, a network administrator and/or end user may need to install and/or configure an operating system and numerous application programs on the information handling system in order to make the information handling system usable from a practical standpoint. However, in recent years, more information handling systems have utilized access controllers in provisioning information handling systems. Broadly speaking, an access controller may permit an administrator or other person to remotely monitor and/or remotely manage an information handling system, even in situations in which the information handling system may be powered down or not have an operating system configured thereupon. However, existing implementations of access controllers are often limited in terms of the management and configuration capabilities in which they allow.

SUMMARY

In accordance with the teachings of the present disclosure, the disadvantages and problems associated with provisioning of information handling systems using access controllers have been reduced or eliminated.

In accordance with one embodiment of the present disclosure, a method for provisioning storage media of an access controller in an information handling system may include storing a definition data structure in storage media associated with an access controller in an information handling system, the definition data structure including one or more parameters. The access controller may create a storage partition on the storage media based at least on the one or more parameters.

In accordance with another embodiment of the present disclosure, an access controller for use in an information handling system may include a processor, storage media communicatively coupled to the processor, and computer-executable instructions carried a computer readable medium communicatively coupled to the processor. The instructions may be readable by the processor and the instructions, when read and executed, may cause the processor to store a definition data structure in the storage media, the definition data structure including one or more parameters, and create a storage partition on the storage media based at least on the one or more parameters.

In accordance with another embodiment of the present disclosure, an information handling system may include a processor, a memory communicatively coupled to the processor, and an access controller communicatively coupled to the processor. The access controller may have a storage media and may be configured to store a definition data structure in the storage media, the definition data structure including one or more parameters and create a storage partition on the storage media based at least on the one or more parameters.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
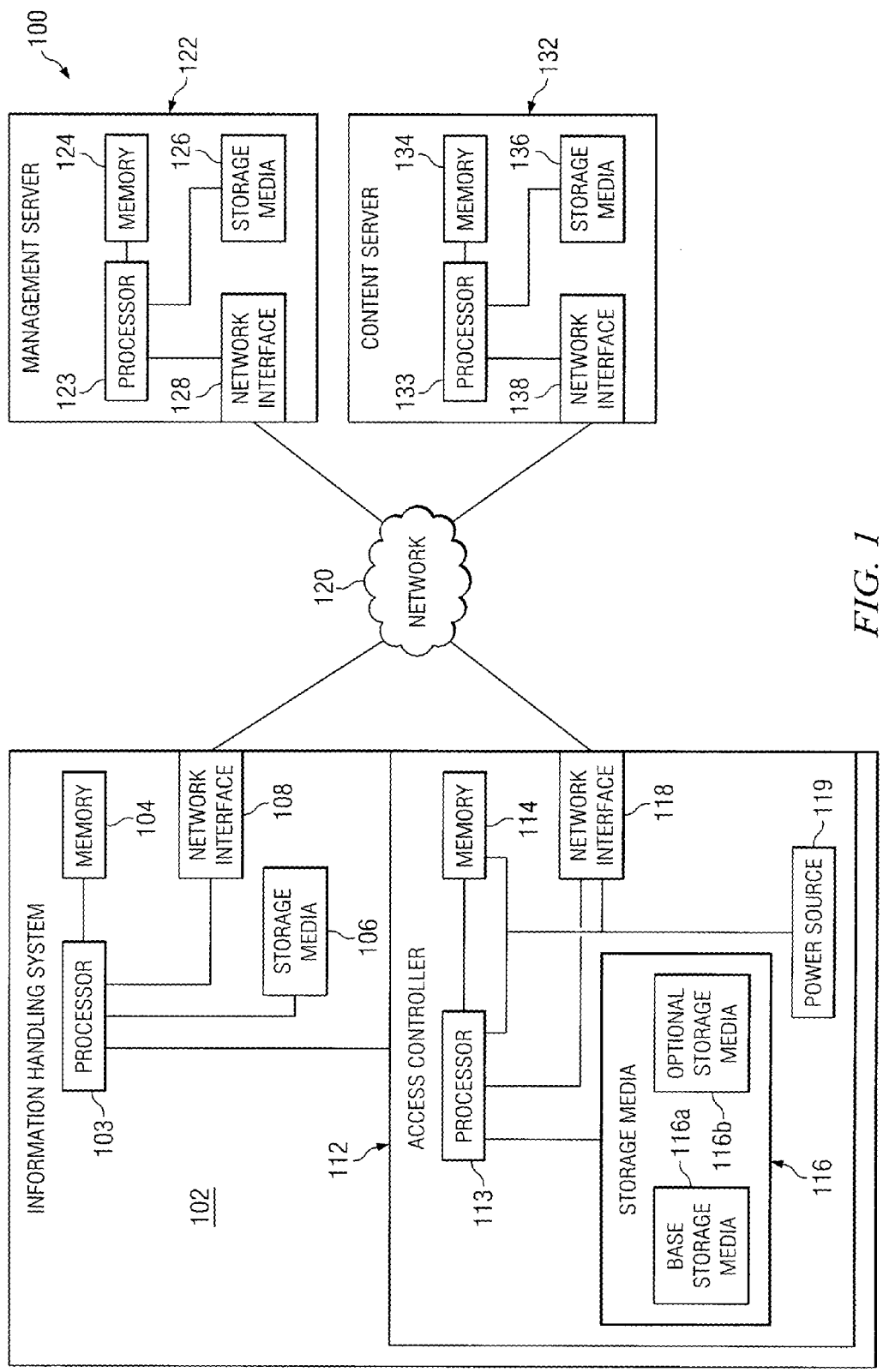
FIG. 1 illustrates a block diagram of an example system for dynamic enablement of storage media associated with an access controller of an information handling system, in accordance with certain embodiments of the present disclosure.
Figure 2:
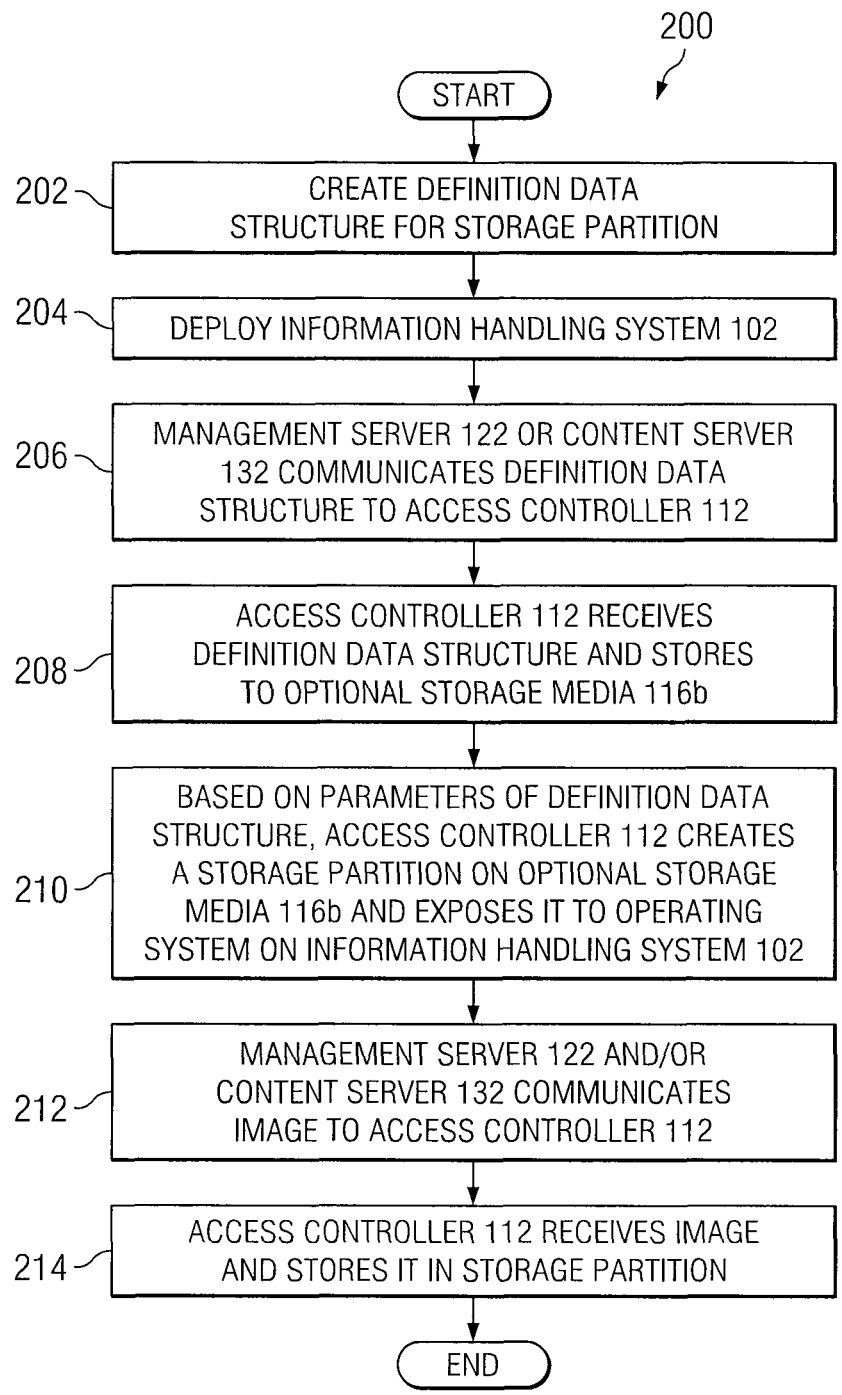
FIG. 2 illustrates a flow chart of an example method for enablement of storage media associated with an access controller, in accordance with certain embodiments of the present disclosure.

Preferred embodiments and their advantages are best understood by reference to FIGS. 1-2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 for dynamic enablement of storage media 116 associated with an access controller 112 of an information handling system 102, in accordance with certain embodiments of the present disclosure. As depicted in FIG. 1, system 100 may include an information handling system 102, a network 120, a management server 122, and a content server 132.

Information handling system 102 may generally be operable to receive data from and/or communicate data to one or more other information handling systems via network 120. In certain embodiments, information handling system 102 may be a server. In another embodiment, information handling system 102 may be a personal computer (e.g., a desktop computer or a portable computer). As depicted in FIG. 1, information handling system 102 may include a processor 103, a memory 104 communicatively coupled to processor 103, storage media 106 communicatively coupled to processor 103, a network interface 108 communicatively coupled to processor 103, and an access controller 112 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage media 106 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Storage media 106 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 108 may include any suitable system, apparatus, or device operable to serve as an interface between information handling system 102 and network 120. Network interface 108 may enable information handling system 102 to communicate over network 120 using any suitable transmission protocol and/or standard, including without limitation all transmission protocols and/or standards enumerated below with respect to the discussion of network 120. In certain embodiments, network interface 108 may be configured with hardware, software, and/or firmware to allow its associated information handling system 102 to remotely boot from a computer-readable medium remote from information handling system 102 (e.g., a computer-readable medium coupled to network interface 108 via network 120).

Access controller 112 may be any system, device, or apparatus configured to permit an administrator or other person to remotely monitor and/or remotely manage information handling system 102 (e.g., via an information handling system remotely connected to information handling system 102 via network 120) regardless of whether information handling system 102 is powered on and/or has an operating system installed thereon. In certain embodiments, access controller 112 may allow for "out-of-band" control of information handling system 102, such that communications to and from access controller 112 are communicated via a management channel physically isolated from the "in band" communication with network interface 108. Thus, for example, if a failure occurs in information handling system 102 that prevents an administrator from remotely accessing information handling system 102 via network interface 108 (e.g., operating system failure, power failure, etc.), the administrator may still be able to monitor and/or manage the information handling system 102 (e.g., to diagnose problems that may have caused failure) via access controller 112. In the same or alternative embodiments, access controller 112 may allow an administrator to remotely manage one or parameters associated with operation of information handling system 102 (e.g., power usage, processor allocation, memory allocation, security privileges, etc.). In certain embodiments, access controller 112 may include or may be an integral part of a Dell Remote Access Controller (DRAC) or an Integrated Dell Remote Access Controller (iDRAC).

As depicted in FIG. 1, access controller 112 may include a processor 113, a memory 114 communicatively coupled to processor 113, storage media 116, a network interface 118 communicatively coupled to processor 113, and a power source 119 electrically coupled to processor 113.

Processor 113 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102.

Memory 114 may be communicatively coupled to processor 113 and may include any system, device, or apparatus configured to retain program instructions and/or data for a period of time (e.g., computer-readable media). Memory 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off or power to access controller 112 is removed. In certain embodiments, memory 114 may store firmware that includes executable instructions to govern operation of access controller 112.

Storage media 116 may generally include computer-readable media operable to store data and/or programs. As shown in FIG. 1, storage media 116 may include base storage media 116a and optional storage media 116b. Base storage media 116a may include computer-readable media (e.g., hard disk drive, and/or other type of rotating storage media, flash memory, EEPROM, and/or other type of solid state storage media) and may be generally operable to store data and/or programs (e.g., one or more operating systems and/or one or more application programs). In some embodiments, base storage media 116a may be integral to access controller 112, such that base storage media 116a is a "fixed" or "permanent" component of access controller 112 (e.g., such that removal of base storage media 116a would cause inoperability of access controller 112).

Similarly, optional storage media 116b may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs). However, optional storage media 116b may be an optional and/or removable component of access controller 112. Optional storage media 116b may be installed in access controller by a manufacturer, end user, and/or any other suitable mechanism. In some embodiments, optional storage media 116b may be externally accessible by an end user and/or administrator. For example, in certain embodiments, optional storage media 116b may include a computer-readable medium (e.g., a flash card, universal serial bus drive, etc.) that may be added and/or interfaced with access controller 112 via an external hardware port.

Network interface 118 may include any suitable system, apparatus, or device operable to serve as an interface between access controller 112 and network 120. Network interface 118 may enable access controller 102 to communicate over network 120 using any suitable transmission protocol and/or standard, including without limitation all transmission protocols and/or standards enumerated below with respect to the discussion of network 120.

Power source 119 may include any system, device, or apparatus configured to and provide electrical energy to one or more components of access controller 112. In certain embodiments, power source 119 may include an alternating current (AC) or direct current (DC) source wherein electrical energy is provided from an electrical outlet (e.g., a 120-volt wall outlet). In certain embodiments, power source 119 may include a battery that stores electrochemical energy and provides electrical energy to one or more components of access controller 112. For example, power source 119 may be a rechargeable battery, meaning that its electrochemical energy may be restored by the application of electrical energy (e.g., a lead and sulfuric acid battery, nickel cadmium (NiCd) battery, nickel metal hydride (NiMH) battery, lithium ion (Li-ion) battery, lithium ion polymer (Li-ion polymer) battery, or any combination of the foregoing, or any other suitable battery). In operation, power source 119 may provide electrical energy to one or more electrical or electronic components (e.g., processor 113, memory 114, network interface 118) supplemental to or in lieu of a "main" power source of information handling system 102 (e.g., electrical power provided via an electrical outlet or a main system battery of information handling system 102).

Network 120 may be a network and/or fabric configured to communicatively couple information handling system 102, access controller 112, management server 122, content server 132, other information handling systems, and/or other networked components to each other. Network 120 may include a communication infrastructure, which provides physical connections, and a management layer, which organizes the physical connections, information handling system 102, access controller 112, management server 122, and content server 132. In the same or alternative embodiments, network 120 may allow block I/O services and/or file access services to network-attached computer-readable media.

Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Management server 122 may comprise an information handling system and may generally be operable to receive data from and/or communicate data to one or more other information handling systems via network 120. In certain embodiments, management server 122 may be configured to communicate data and/or instructions to information handling system 102 in order to manage, maintain, and/or control information handling system 102 and/or its various components, as discussed in greater detail elsewhere in this disclosure. In the same or alternative embodiments, management server 122 may manage, maintain, and/or control information handling system 102 using one or more management-based protocols, such as simple network management protocol (SNMP) or Intelligent Platform Management Interface (IPMI), for example. As depicted in FIG. 1, management server 122 may include a processor 123, a memory 124 communicatively coupled to processor 123, storage media 126 communicatively coupled to processor 123, and a network interface 128 communicatively coupled to processor 123.

Processor 123 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124, storage media 126 and/or another component of management server 122.

Memory 124 may be communicatively coupled to processor 123 and may include any system, device, or apparatus configured to retain program instructions and/or data for a period of time (e.g., computer-readable media). Memory 124 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to management server 122 is turned off.

Storage media 126 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 128 may include any suitable system, apparatus, or device operable to serve as an interface between management server 122 and network 120. Network interface 128 may enable management server 122 to communicate over network 120 using any suitable transmission protocol and/or standard, including without limitation all transmission protocols and/or standards enumerated above with respect to the discussion of network 120. In certain embodiments, network interface 128 may be configured with hardware, software, and/or firmware to allow its associated management server 122 to remotely boot from a computer-readable medium remote from management server 122 (e.g., a computer-readable medium coupled to network interface 128 via network 120).

Content server 132 may comprise an information handling system and may generally be operable to receive data from and/or communicate data to one or more other information handling systems via network 120. In certain embodiments, content server 132 may be configured to communicate with information handling system 102 via network 124 in order to deliver content to information handling system 102. For example, content server 132 may include a website, FTP site, and/or similar site that may communicate content to information handling system 102. Content communicated by content server 132 may include, without limitation, data, programs, and/or any other file or collection of files. As depicted in FIG. 1, content server 132 may include a processor 133, a memory 134 communicatively coupled to processor 133, storage media 136 communicatively coupled to processor 133, and a network interface 138 communicatively coupled to processor 133.

Processor 133 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 133 may interpret and/or execute program instructions and/or process data stored in memory 134, storage media 136 and/or another component of management server 132.

Memory 134 may be communicatively coupled to processor 133 and may include any system, device, or apparatus configured to retain program instructions and/or data for a period of time (e.g., computer-readable media). Memory 134 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to content server 132 is turned off.

Storage media 136 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 138 may include any suitable system, apparatus, or device operable to serve as an interface between content server 132 and network 120. Network interface 138 may enable content server 132 to communicate over network 120 using any suitable transmission protocol and/or standard, including without limitation all transmission protocols and/or standards enumerated above with respect to the discussion of network 120. In certain embodiments, network interface 138 may be configured with hardware, software, and/or firmware to allow its associated content server 132 to remotely boot from a computer-readable medium remote from content server 132 (e.g., a computer-readable medium coupled to network interface 138 via network 120).

FIG. 2 illustrates a flow chart of an example method 200 for enablement of storage media 116 associated with access controller 112, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps 202-214 comprising method 200 may depend on the implementation chosen.

At step 202, an administrator or other person may create a definition data structure for a storage partition to be created on optional storage media 116b. The definition data structure may include a file header block, database, table, and/or other suitable data structure. The definition data structure may include one or more parameters for the storage partition to be created. In certain embodiments, the definition data structure may be part of a library or repository of pre-defined or commonly-used definition data structures. In certain embodiments, the definition data structure may include one or more of the following parameters:

A parameter indicating the type of exposure of the storage partition to an operating system (e.g., whether the storage partition will appear to an operating system as an external universal serial bus drive, a CD-ROM, a floppy disk, and/or another type of storage medium);

A parameter indicating the size of the storage partition to be created;

A parameter indicating a mounting mechanism for the storage partition (e.g., read-only or read-write access).

A parameter indicating a file system type (e.g., EXT2, FAT32, etc.);

An identifier (e.g, volume name) for the storage partition so that it may be properly identified by an operating system;

An identifier for the storage system so that it may be identified by a user, administrator, or other person;

A security key (e.g., a cryptographic key such that access controller 112 or another component of system 100 may authenticate the definition data structure);

A parameter indicating a timeout delay (e.g., a maximum amount of time the storage partition may be exposed to an operating system); and One or more parameters defining a schedule for exposure of the storage partition to an operating system.

At step 204, an administrator, end user, or another person may deploy information handling system 102 and place it in system 100. For example, deployment of information handling system 102 may include coupling the information handling system 102 to network 120 via network interface 108 and/or network interface 118.

At step 206, management server 122 and/or content server 132 may communicate the definition data structure to access controller 112 via network 120. In certain embodiments, such communication will take place "out-of-band" such that communication to access controller 112 is communicated via a management channel physically isolated from the "in band" communication with network interface 108 (e.g., allowing communication to access controller 112 independent of whether information handling system 102 is powered on and/or executing an operating system). In the same or alternative embodiments, the definition data structure may be communicated as part of an update package (e.g., a software or firmware update or "patch").

At step 208, access controller may receive the definition data structure via network interface 118 and may store the definition data structure to optional storage media 116b.

At step 210, access controller 112 may create a storage partition on optional storage media 116b and expose it to an operating system on information handling system 102 based at least on the parameters set forth in the definition data structure. For example, the created partition may appear to an operating system on information handling system 102 (e.g., as a USB drive) based on parameters set forth in the definition data structure, and/or may be sized in accordance with parameters set forth in the definition data structure.

At step 212, management server 122 and/or content server 132 may communicate an image access controller 112. The image may include one or more applications, agents, and/or data that an administrator, end user, or other person may desire to have executed or otherwise made available to information handling system 102 and/or an operating system executing thereupon. In certain embodiments, the communication of the image from management server 122 and/or content server 132 to the storage partition on optical storage media 116b may be initiated automatically. For example, management server 122 and/or content server 132 may be configured to deliver the image immediately after or a specified time after receipt of the definition data structure and/or creating of the partition by access controller 112. In other embodiments, the communication of the image may be initiated manually (e.g., by an administrator and/or other person issuing a command or other instruction for delivery of the data). In certain embodiments, the image may be communicated out of band.

In certain embodiments, the server communicating an image to access controller 112 may be the same of different than the server communicating the definition data structure ay step 206. For example, in some embodiments, an administrator may (at step 206) instruct management server 122 to communicate a definition data structure to access controller 112, which may then cause access controller to create an appropriate partition on storage media 116b. Subsequently, at step 212, content server 132 may (e.g., in response to a request from either of management server 122 and/or access controller 112 or other indication that the appropriate partition has been created on storage media 116b) communicate an image to access controller 112.

At step 214, access controller 112 may receive the image (e.g., via network interface 118) and store it in the storage partition. Once stored in the storage partition, the image may be accessible by information handling system 102 and/or an operating system executing thereupon based at least on parameters present in the definition data structure. After completion of step 214, method 200 may end.

Although FIG. 2 discloses a particular number of steps to be taken with respect to method 200, method 200 may be executed with greater or lesser steps than those depicted in FIG. 2. For example, in certain embodiments, steps 202 and/or 204 may not be executed. In such embodiments, management server 122 or content server 132 may communicate a pre-existing definition data structure to access controller 112 of a pre-existing information handling system at step 206, and method 200 may proceed as set forth above. As another example, in certain embodiments, steps 202-210 may not be executed. In such embodiments, a management server 122 and/or content server 132 may communicate an image to access controller at 112, and access controller 112 may store such image in a pre-existing storage partition.

In addition, although FIG. 2 discloses a certain order of steps to be taken with respect to method 200, the steps comprising method 200 may be completed in any suitable order. For example, in some embodiments, step 204 may be performed before, after, or substantially contemporaneous to step 202. As another example, in some embodiments, information handling system 102 may be deployed with the definition data structure already stored on optional storage media 116b.

Method 200 may be implemented using system 100 or any other system operable to implement method 200. In certain embodiments, method 200 may be implemented partially or fully in software and/or firmware embodied in computer-readable media.

Methods similar to method 200 above may be used to provide for creation and/or management of other partitions on optional storage media 116b, and/or the delivery and/or management of other images on optional storage media 116b. For example, if an administrator desires to create an additional partition on optional storage media 116, the administrator or another person may communicate a new definition data structure to access controller 112, which may then create the new partition defined by the definition data structure or modify an existing partition as defined by the definition data structure. As another example, an administrator or another person may communicate a new image to be stored on a newly-created partition, or an already-existing partition.

In addition, methods similar to method 200 above may be used to provide for deletion or disablement of previously-created partitions and/or delivered images. For example, an administrator may communicate a new definition data structure to access controller 112, which may, when processed by the access controller, delete or disable an image and/or partition (e.g., by ending its exposure to an operating system).

Using the methods and systems disclosed herein, problems associated with conventional approaches to provisioning of an information handling system may be improved, reduced, or eliminated. For example, the methods and systems disclosed herein allow for the ability to create an "on-the-fly" partition on an access controller of an information handling system, wherein the creation, operation, and consumption of the partition is out of band and agnostic of any operating system present on the information handling system. In addition, the systems and methods disclosed herein provide a mechanism whereby specific applications, agents, and/or data may be delivered to the partition.

Although the present disclosure has been described in detail, it should be understood that various changes, substitutions, and alterations can be made hereto without departing from the spirit and the scope of the disclosure as defined by the appended claims.

What is claimed is:

1. A method for provisioning storage media of an access controller in an information handling system, comprising:
   receiving a definition data structure via an out-of-band management channel coupling a network to an access controller integral to the information handling system, the out-of-band management channel physically isolated from an in-band communication channel coupling the information handling system to the network via a network interface integral to the information handling system and independent of the access controller, wherein the out-of-band management channel is configured to receive communications regardless of the power state of the information handling system;
   storing the definition data structure in storage media associated with the access controller, the definition data structure including one or more parameters; and
   the access controller creating a storage partition on the storage media based at least on the one or more parameters.

2. A method according to claim 1, the one or more parameters including at least one of: (i) a parameter indicating a type of exposure of the storage partition to an operating system executing on the information handling system, (ii) a parameter indicating a size of the storage partition to be created, (iii) a parameter indicating a mounting mechanism for the storage partition, (iv) a parameter indicating a file system type, (v) an identifier for the storage partition, (vi) a security key, (vii) a parameter indicating a timeout delay, and (viii) a parameter defining a schedule for exposure of the storage partition to an operating system.

3. A method according to claim 1, further comprising creating the definition data structure.

4. A method according to claim 1, wherein the definition data structure is received from one of a management server and a content server.

5. A method according to claim 1, further comprising:
   the access controller receiving an image; and
   the access controller storing the image on the storage partition such that the image may be read by an operating system executing on the information handling system.

6. A method according to claim 5, wherein receiving the image includes receiving the image out of band via a management channel physically isolated from an in-band communication channel associated with a network interface of the information handling system.

7. A method according to claim 5, wherein the image is received from one of a management server and a content server.

8. An access controller for use in an information handling system, comprising:
   a processor;
   storage media communicatively coupled to the processor; and
   computer-executable instructions carried a computer readable medium communicatively coupled to the processor, the instructions readable by the processor, the instructions, when read and executed, for causing the processor to:
      receive a definition data structure via an out-of-band management channel coupling the access controller to a network, the out-of-band management channel physically isolated from an in-band communication channel coupling the information handling system to the network via a network interface integral to the information handling system and independent of the access controller, wherein the out-of-band management channel is configured to receive communications regardless of the power state of the information handling system;
      store a definition data structure in the storage media, the definition data structure including one or more parameters; and
      create a storage partition on the storage media based at least on the one or more parameters.

9. An access controller according to claim 8, the one or more parameters including at least one of: (i) a parameter indicating a type of exposure of the storage partition to an operating system executing on the information handling system, (ii) a parameter indicating a size of the storage partition to be created, (iii) a parameter indicating a mounting mechanism for the storage partition, (iv) a parameter indicating a file system type, (v) an identifier for the storage partition, (vi) a security key, (vii) a parameter indicating a timeout delay, and (viii) a parameter defining a schedule for exposure of the storage partition to an operating system.

10. An access controller according to claim 8, the computer-readable instructions further operable to cause the processor to receive the definition data structure from one of a management server and a content server.

11. An access controller according to claim 8, the computer-readable instructions further operable to cause the processor to:
   receive an image; and
   store the image on the storage partition such that the image may be read by an operating system executing on an information handling system associated with the access controller.

12. An access controller according to claim 11, the computer-readable instructions further operable to cause the processor to receive the image out of band via a management channel physically isolated from an in-band communication channel associated with a network interface of the information handling system.

13. An access controller according to claim 11, the computer-readable instructions further operable to cause the processor to receive the image from one of a management server and a content server.

14. An information handling system comprising:
   a processor;
   a memory communicatively coupled to the processor;
   a network interface configured to couple the information handling system to a network via an in-band communication channel; and an access controller communicatively coupled to the processor and independent of the network interface, the access controller having a storage media and configured to:
receive a definition data structure via an out-of-band management channel coupling the access controller to a network, the out-of-band management channel physically isolated from the in-band communication channel, wherein the out-of-band management channel is configured to receive communications regardless of the power state of the information handling system;
store the definition data structure in the storage media, the definition data structure including one or more parameters; and
create a storage partition on the storage media based at least on the one or more parameters.

15. An information handling system according to claim 14, the access controller further configured to:
store the image on the storage partition such that the image may be read by the processor.

16. An information handling system according to claim 14, the one or more parameters including at least one of: (i) a parameter indicating a type of exposure of the storage partition to an operating system executing on the information handling system, (ii) a parameter indicating a size of the storage partition to be created, (iii) a parameter indicating a mounting mechanism for the storage partition, (iv) a parameter indicating a file system type, (v) an identifier for the storage partition, (vi) a security key, (vii) a parameter indicating a timeout delay, and (viii) a parameter defining a schedule for exposure of the storage partition to an operating system.

17. An information handling system according to claim 14, the access controller further configured to create the definition data structure.

18. An information handling system according to claim 14, wherein receiving the definition data structure comprises receiving the definition data structure from one of a management server and a content server.

19. An information handling system according to claim 14, the access controller further configured to:
receive an image; and
store the image on the storage partition such that the image may be read by an operating system executing on the information handling system.

20. An information handling system according to claim 14, wherein receiving the image includes receiving the image out of band via a management channel physically isolated from an in-band communication channel associated with a network interface of the information handling system.

* * * * *